(12) United States Patent
Kwak et al.

(10) Patent No.: US 11,968,689 B2
(45) Date of Patent: *Apr. 23, 2024

(54) MONITORING DOWNLINK CONTROL CHANNELS FOR UNLICENSED OPERATION

(71) Applicant: Intel Corporation, Santa Clara, CA (US)

(72) Inventors: Yongjun Kwak, San Diego, CA (US); Bishwarup Mondal, San Ramon, CA (US); Daewon Lee, Portland, OR (US); Hwan-Joon Kwon, Santa Clara, CA (US); Lopamudra Kundu, Sunnyvale, CA (US); Hong He, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/828,796

(22) Filed: May 31, 2022

(65) Prior Publication Data

US 2022/0322315 A1 Oct. 6, 2022

Related U.S. Application Data

(63) Continuation of application No. 16/738,193, filed on Jan. 9, 2020, now Pat. No. 11,375,490.

(60) Provisional application No. 62/806,683, filed on Feb. 15, 2019, provisional application No. 62/790,959, filed on Jan. 10, 2019.

(51) Int. Cl.
*H04W 72/23* (2023.01)
*H04L 5/00* (2006.01)
*H04W 72/0446* (2023.01)

(52) U.S. Cl.
CPC ............ *H04W 72/23* (2023.01); *H04L 5/001* (2013.01); *H04L 5/0053* (2013.01); *H04L 5/0094* (2013.01); *H04W 72/0446* (2013.01)

(58) Field of Classification Search
CPC  H04W 72/0446; H04W 72/23; H04L 5/0094; H04L 5/0053; H04L 5/001
USPC ........................................................ 370/329
See application file for complete search history.

(56) References Cited

U.S. PATENT DOCUMENTS

| 11,375,490 B2 * | 6/2022 | Kwak ................... H04W 72/23 |
| 2018/0323917 A1 | 11/2018 | Um et al. |
| 2020/0092861 A1 | 3/2020 | Xu et al. |
| 2020/0092913 A1 | 3/2020 | Xu et al. |
| 2020/0100286 A1 | 3/2020 | Xu et al. |
| 2020/0146058 A1 | 5/2020 | Xu et al. |

(Continued)

FOREIGN PATENT DOCUMENTS

WO  WO-2020089855 A1 * 5/2020

OTHER PUBLICATIONS

United States Patent Office—Office Action dated Sep. 2, 2021 from U.S. Appl. No. 16/738,193, 14 pages.

(Continued)

*Primary Examiner* — Peter G Solinsky
(74) *Attorney, Agent, or Firm* — Schwabe, Williamson & Wyatt, P.C.

(57) ABSTRACT

Methods, systems, and storage media are described for monitoring downlink control information (DCI). In particular, some embodiments may be directed to monitoring DCI for an indication of channel occupancy time (COT) information. Other embodiments may be described and/or claimed.

13 Claims, 12 Drawing Sheets

300

Generating a downlink control information (DCI) message, wherein the DCI is to indicate channel occupancy time (COT) information
305

Encoding the message for transmission to a user equipment (UE)
310

(56) References Cited

U.S. PATENT DOCUMENTS

| | | |
|---|---|---|
| 2021/0212120 A1 | 7/2021 | Jiang et al. |
| 2021/0219341 A1 | 7/2021 | Jia et al. |
| 2021/0250925 A1 | 8/2021 | Zhang et al. |
| 2021/0266135 A1 | 8/2021 | Fu et al. |
| 2022/0210830 A1* | 6/2022 | Lin .................. H04W 74/0808 |

OTHER PUBLICATIONS

United States Patent Office—Notice of Allowance dated Mar. 1, 2022 from U.S. Appl. No. 16/738,193, 8 pages.

* cited by examiner

100 

```
┌─────────────────────────────────────────────────────────────────┐
│   Retrieving channel occupancy time (COT) information from a memory │
│                              105                                │
└─────────────────────────────────────────────────────────────────┘
                                │
                                ▼
┌─────────────────────────────────────────────────────────────────┐
│ Generating a message that includes downlink control information (DCI), wherein the │
│              DCI is to indicate the COT information              │
│                              110                                │
└─────────────────────────────────────────────────────────────────┘
                                │
                                ▼
┌─────────────────────────────────────────────────────────────────┐
│        Encoding the message for transmission to a user equipment (UE)        │
│                              115                                │
└─────────────────────────────────────────────────────────────────┘
```

FIG. 1

| Value of 1-bit field | Monitoring period |
|---|---|
| 0 | Period T1, same as before decoding DCI 2_0, i.e. mini-slot in FIG.5 |
| 1 | Period T2, configured to UE by higher layers, e.g. slot in FIG.5 |

MONITORING DOWNLINK CONTROL CHANNELS FOR UNLICENSED OPERATION

RELATED APPLICATIONS

This application is a continuation of U.S. patent application Ser. No. 16/738,193 filed Jan. 9, 2020 and entitled "MONITORING DOWNLINK CONTROL CHANNELS FOR UNLICENSED OPERATION," which claims priority to U.S. Provisional Patent Application No. 62/790,959 filed Jan. 10, 2019 and entitled "MONITORING DOWNLINK CONTROL CHANNELS FOR UNLICENSED OPERATION"; and to U.S. Provisional Patent Application No. 62/806,683 filed Feb. 15, 2019 and entitled "MONITORING DOWNLINK CONTROL CHANNELS FOR UNLICENSED OPERATION," the entire disclosures of which are incorporated by reference in their entirety.

FIELD

Embodiments of the present disclosure relate generally to the technical field of wireless communications.

BACKGROUND

Among other things, embodiments of the present disclosure are directed to the monitoring of downlink control information (DCI). In particular, some embodiments may be directed to monitoring DCI for an indication of channel occupancy time (COT) information.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1, 2, and 3 illustrate examples of operation flow/algorithmic structures in accordance with some embodiments.

DETAILED DESCRIPTION

Figure 2:
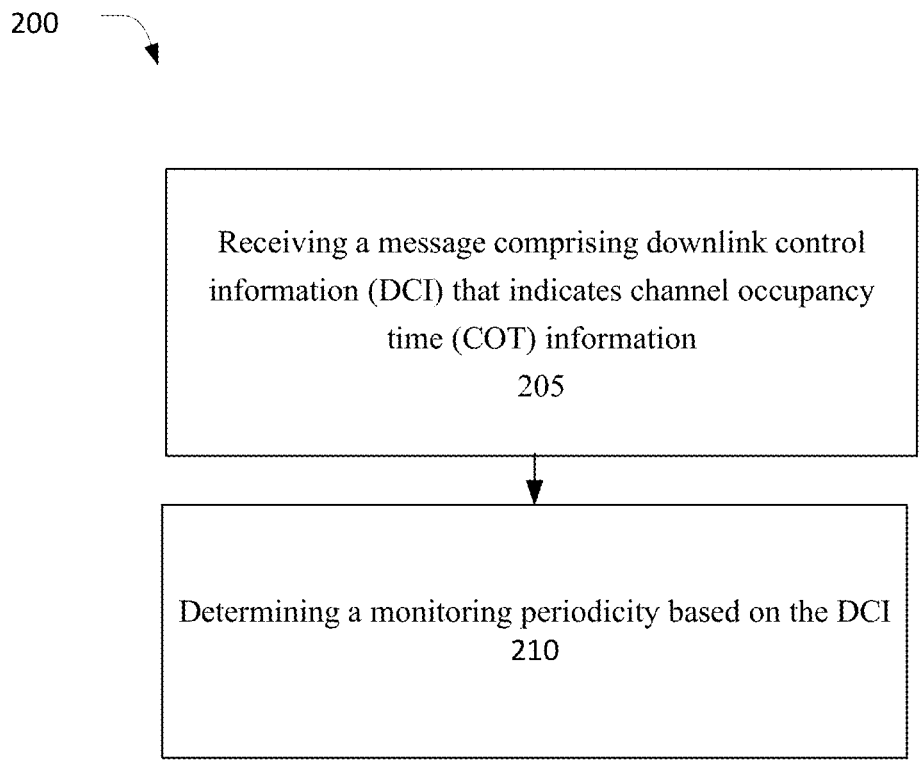

Embodiments discussed herein may relate to monitoring downlink control information (DCI). In particular, some embodiments may be directed to monitoring DCI for an indication of channel occupancy time (COT) information. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

One enhancement for long-term evolution (LTE) systems had been to enable the operation of cellular networks in the unlicensed spectrum, via Licensed-Assisted-Access (LAA). Ever since, exploiting the access of unlicensed spectrum has been considered by 3GPP as one of the promising solutions to cope with the ever increasing growth of wireless data traffic. One of the important considerations for LTE to operate in unlicensed spectrum is to ensure fair co-existence with incumbent systems like wireless local area networks (WLANs), which has been the primary focus of the LAA standardization effort.

Following the trend of LTE enhancements, study on NR based access to unlicensed spectrum (NR-unlicensed) has begun, including a study item (SI) on "NR-Based Access to Unlicensed Spectrum." Within the scope of this SI, one of the primary objectives is to identify additional functionalities that are needed for a physical (PHY) layer design of NR to operate in unlicensed spectrum. In particular, it is desirable to minimize the design efforts by identifying enhancements needed to enable unlicensed operation, while avoiding unnecessary divergence from the licensed framework. Coexistence methods already defined for LTE-based LAA context should be assumed as the baseline for the operation of NR-unlicensed systems, while enhancements over these existing methods are not precluded. NR-based operation in unlicensed spectrum should not impact deployed Wi-Fi services (data, video and voice services) more than an additional Wi-Fi network on the same carrier.

NR-unlicensed technologies can be categorized into different modes, viz., Carrier Aggregation (CA), Dual Connectivity (DC) and Standalone (SA) modes of network operation. The channel access mechanism aspect is one of the fundamental building blocks for NR-unlicensed that is essential for any deployment options. The adoption of Listen-Before-Talk (LBT) in LTE based LAA system was crucial in achieving fair coexistence with the neighboring systems sharing the unlicensed spectrum in addition to fulfilling the regulatory requirements. The LBT based channel access mechanism fundamentally resembles the WLAN's Carrier Sense Multiple Access with Collision Avoidance (CSMA/CA) principles. Any node that intends to transmit in unlicensed spectrum first performs a channel sensing operation before initiating any transmission. An additional random back-off mechanism is adopted to avoid collisions when more than one nodes senses the channel as idle and transmits simultaneously.

In NR-Unlicensed, the transmitter device can transmit its data payload by acquiring Channel Occupancy Time (COT), where the transmitter device can use the time resource inside the COT by transmitting its own data payload or share the resource with other devices. If a next-generation NodeB (gNB) acquires a COT, it will use the whole resource inside the COT. Therefore, the other devices that can receive the gNB signal cannot actually transmit any data during the COT by the LBT regulation. Therefore, it is beneficial for gNB to indicate the COT information to other devices, including the length of the COT or how to share the COT with other devices, in order that the other devices can just sleep during the COT or they can transmit if the COT is shared to them.

Some embodiments may include using DCI (Downlink Control Information) format 2_0 for the indication of COT and Physical Downlink Control Channel (PDCCH) monitoring. In addition to the functionalities provided by DCI format 2_0, the COT structure may be indicated in the time domain. In some embodiments, the time domain instances in which the UE is expected to receive PDCCH can change dynamically, e.g. by implicit determination related to the gNB's COT, or explicitly signalled by the gNB.

DCI format 2_0 was originally designed for indicating slot format to a group of UEs but it is being discussed to be used for the indication of COT. And for indication of the COT, monitoring operation of DCI format 2_0 may need to be modified from the regular DCI format 2_0. In the above context, this disclosure provides solutions to monitor the DCI format 2_0 for the indication of COT sharing information.

Indicating COT Information by DCI Format 2_0

Figure 4A:
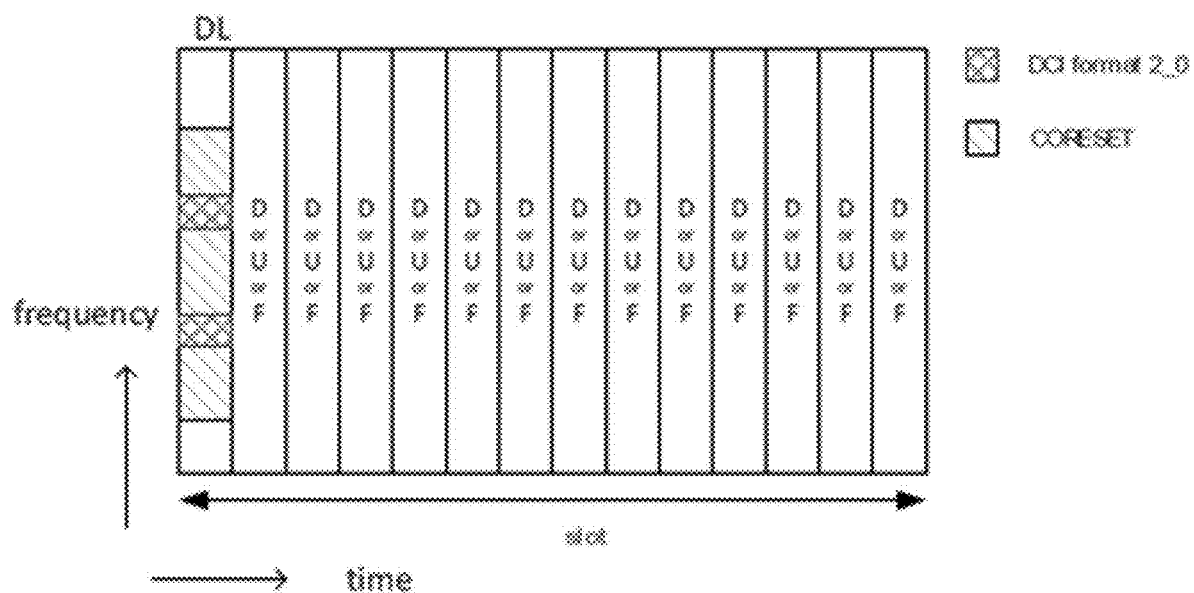
FIG. 4A illustrates an example of downlink control information format 2_0 (DCI 2_0) inside a control resource set in accordance with some embodiments.

FIG. 4A illustrates the resource allocation for DCI format 2_0 for NR. First, control resource set (CORESET) is configured in a certain time frequency resources as shown in blue region. Inside the common PDCCH recourse set, DCI format 2_0 is transmitted using a PDCCH where CRC is masked with SFI-RNTI.

Figure 4B:
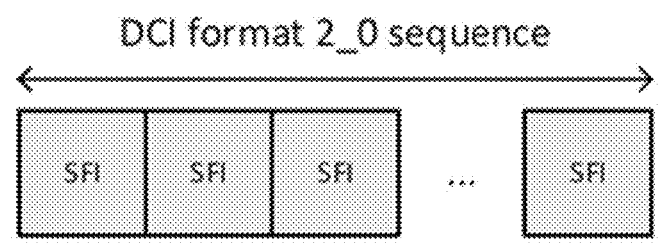
FIG. 4B illustrates an example of a DCI 2_0 payload in accordance with some embodiments.

DCI format 2_0 is transmitted via PDCCH for a set of UEs in a cell and this channel at least indicates the slot format related information, i.e., which symbols in a slot are used for DL (D), UL (U), or Flexible (F). DCI format 2_0 includes slot format combination index which indicates the actual slot format combinations for one or multiple slots as shown in FIG. 4B. Total size of the DCI 2_0 payload is semi-statically configured and the actual position of the slot format indicator inside the DCI format 2_0 payload that a UE need to read is also semi-statically configured by the base station (also referred to as the "gNB").

Figure 4C:
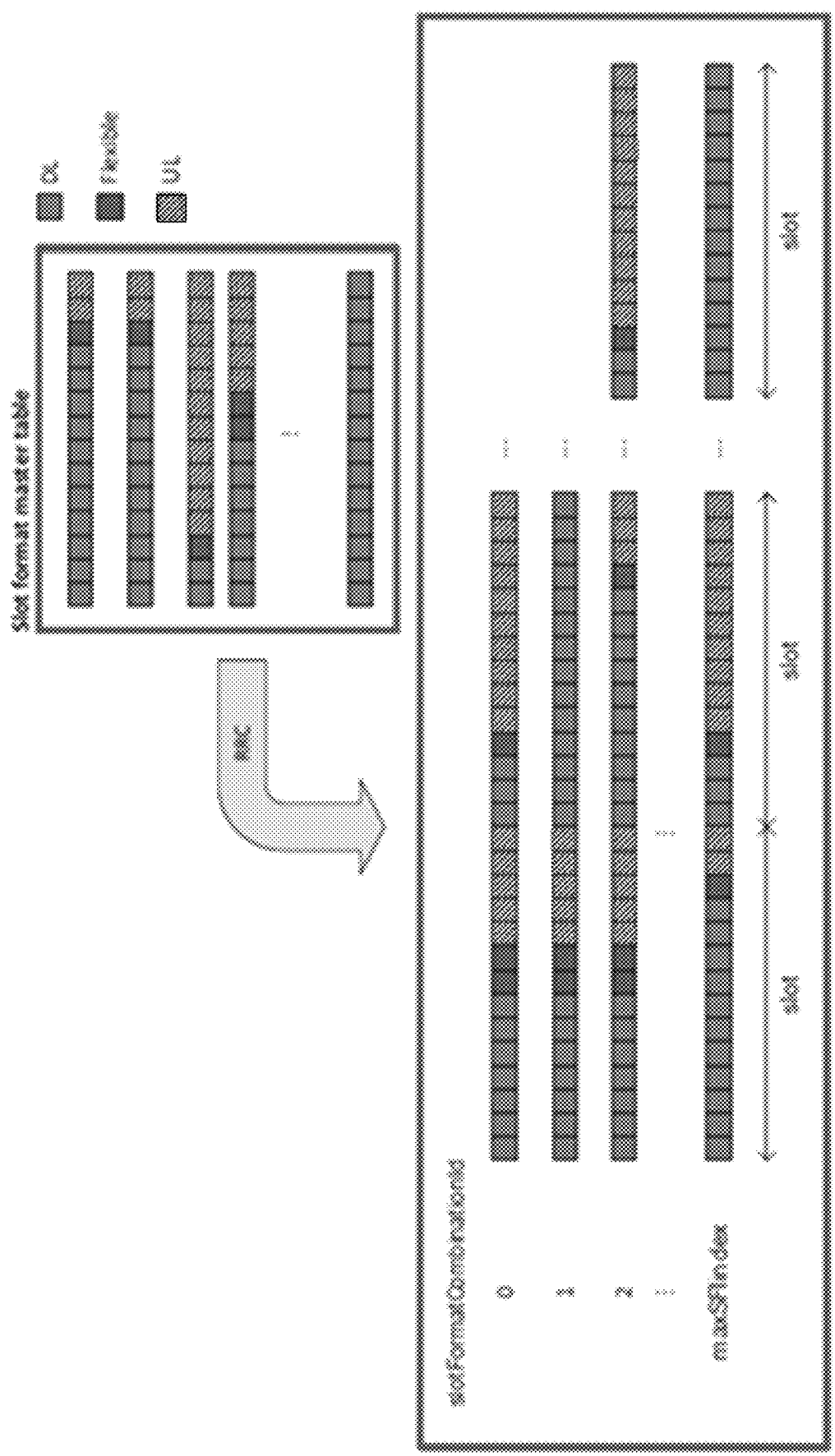
FIG. 4C illustrates an example of a configuration of slot format combinations in accordance with some embodiments.

FIG. 4C illustrates an example of how to configure the slot format combination from the slot format master table. The slot format master table is the whole list of possible combination of D, U and F inside a slot. And RRC configures multiple slot format combination by combining different slot formats for one or multiple slot lengths and separate index is given to each slot format combination. For the monitoring of the DCI 2_0, control resource set (CORE- SET) is configured and inside the common CORESET, DCI format 2_0 is transmitted using a PDCCH where CRC is masked with SFI-RNTI.

In one embodiment, each slot format combination comprises one or multiple slot formats, which means that DCI 2_0 can indicate the length of the slot format combination and this can be interpreted by the UE as the length of the COT acquired by the gNB. For indicating COT information, DCI 2_0 may need to be monitored in a certain time granularity. If the monitoring time granularity is small, then the channel access efficiency can be increased. However, the UE monitoring behavior becomes more complicated, which leads to more battery power consumption in UE side. If the monitoring time granularity is smaller (e.g., smaller than slot length, mini-slot level monitoring) for better channel access, once a COT is acquired by the gNB and if the UE knows the length of the COT, then the UE can increase the periodicity of PDCCH monitoring (e.g., slot level monitoring) during the COT duration indicated by DCI 2_0 for saving the battery power.

Figures 4D, 4E:
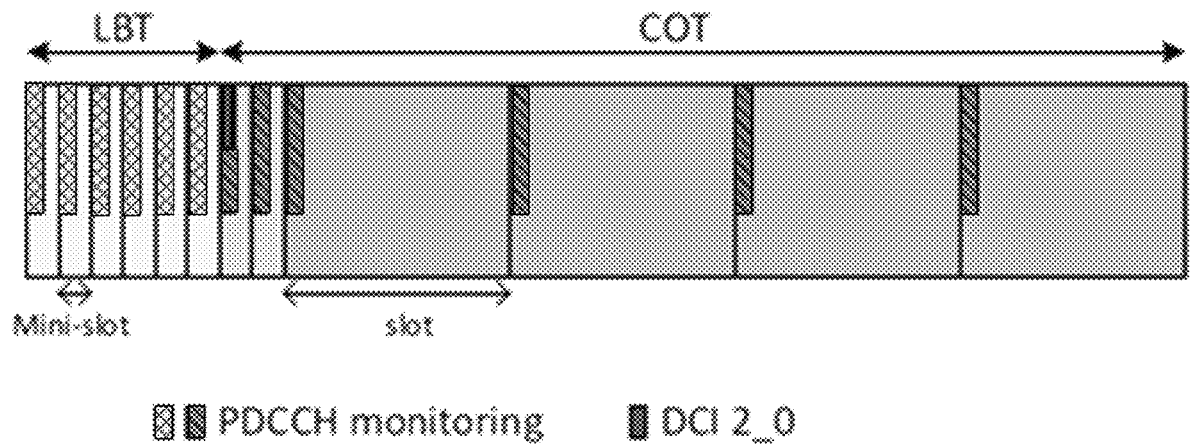
FIG. 4D illustrates an example of physical downlink control channel (PDCCH) monitoring for DCI 2_0 in accordance with some embodiments.
FIG. 4E illustrates an example of a field for indicating a monitoring period in accordance with some embodiments.

The actual monitoring periodicities (one for outside of a COT and the other for inside a COT) can be configured by RRC, or fixed in the specification, or also indicated by DCI information or a combination of them. In one embodiment, a set of periodicity configurations can be defined or tabulated in the spec. Then, a subset of the items in the table can be selected by high layers e.g. System information block (SIB) or dedicated RRC signaling. FIG. 4D illustrates an example of the UE monitoring operation before and after COT is acquired. If the DCI 2_0 is detected in the middle of the slot, remaining slot may use mini-slot level scheduling so that UE may still keep mini-slot level monitoring up to the next slot boundary (or during a pre-defined amount of time).

For achieving different monitoring operation, it is also possible that type-3 common search space (CSS) is configured with mini-slot level monitoring and UE-specific search space (USS) is configured with slot level monitoring. Then DCI 2_0 can be transmitted using type-3 CSS and other UE-specific DCIs can be transmitted using USS.

If a UE detects the DCI 2_0 and decode the information of DCI 2_0 indicating COT structure, the UE at least knows the length of the COT acquired by the gNB and channel will be occupied during the length of the COT. Therefore, the UE does not try to perform access channel to get the channel at least during the indicated COT duration.

In another embodiment, if a UE detects the DCI 2_0 and decode the information of DCI 2_0 indicating COT structure, the UE can know the length of the COT acquired by the gNB and channel will be occupied during the length of the COT. During the COT duration, UE may reduce the PDCCH monitoring once the COT indication is detected by the UE. If DCI 2_0 is not correctly received by a UE, if the UE-specific PDCCH may transmit all the possible scheduling which does not require prior information of DCI 2_0. In this case, the UE may need to monitor DCI 2_0 and other DCIs every mini-slot granularity unless the UE receives DCI 2_0 for COT indication. In some other designs, DCI 2_0 may include a field indicating the monitoring period of UE-specific search space (US S) that UE should monitor for data scheduling within COT. For example, 1-bit field may be included to indicate the monitoring period as shown in FIG. 4E.

As one example, a gNB may intend to schedule latency-sensitive traffic application and correspondingly UEs may be indicated with "0" to continue using mini-slot granularity for PDCCH monitoring. On the other hand, UE may indicate to use a larger period e.g. slot granularity for PDCCH monitoring if eMBB traffic is targeted so as to minimize the power consumption from PDCCH monitoring. Additionally, given the DCI 2_0 is sort of cell-specific signaling and applied for all UEs, the UE may be grouped first and then multiple 1-bit fields may be included in DCI 2-0, which is one-to-one associated with UE groups to indicate the PDCCH monitoring period on a per UE group basis. In some examples, the UE may be grouped based on the traffic types, e.g., URLLC or eMBB.

Figure 4F:
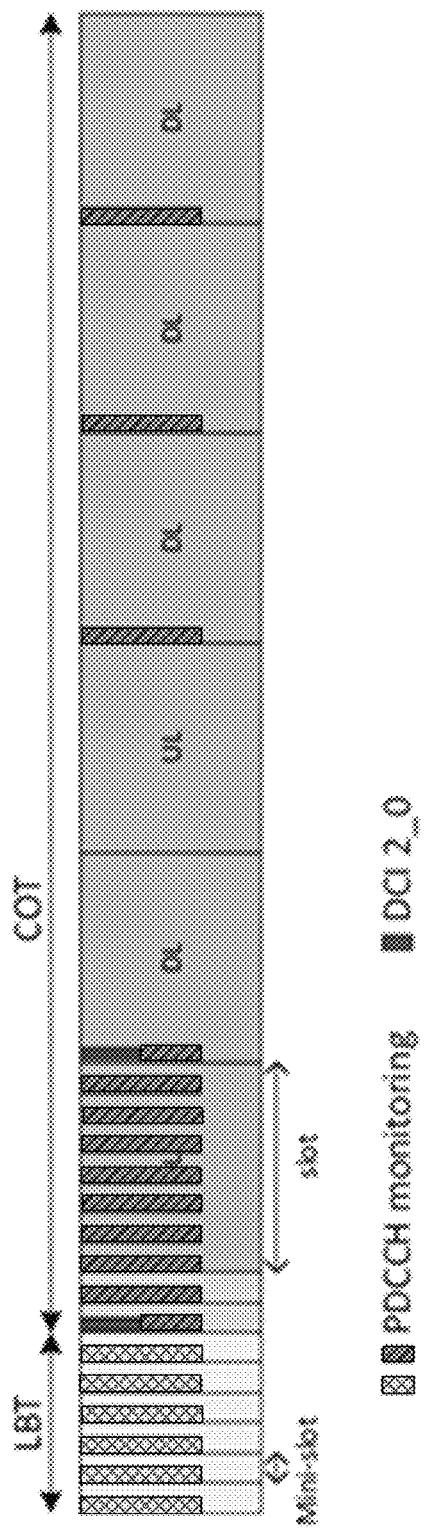
FIG. 4F illustrates another example of PDCCH monitoring in accordance with some embodiments.

In another embodiment, DCI 2_0 can be the pre-requisite for the other DCIs inside the acquired COT. FIG. 4F illustrates an example of PDCCH monitoring for DCI 2_0. For example, a UE tries to monitor DCI 2_0 first for checking whether the gNB acquires COT or not. If the UE detects DCI 2_0 then the UE can now monitor other DCIs according to the COT information including DL/UL combination and the length of the COT indicated by DCI 2_0. Here the monitoring for DCI 2_0 can be based on mini-slot granularity and monitoring of other DCI can be based on slot granularity at least inside the COT duration indicated by DCI 2_0. So the monitoring operation can be reduced since UE only monitors DCI 2_0 using mini-slot granularity first and then monitor the other DCI using larger time granularity, which can reduce the battery consumption of the UE.

Figure 4G:
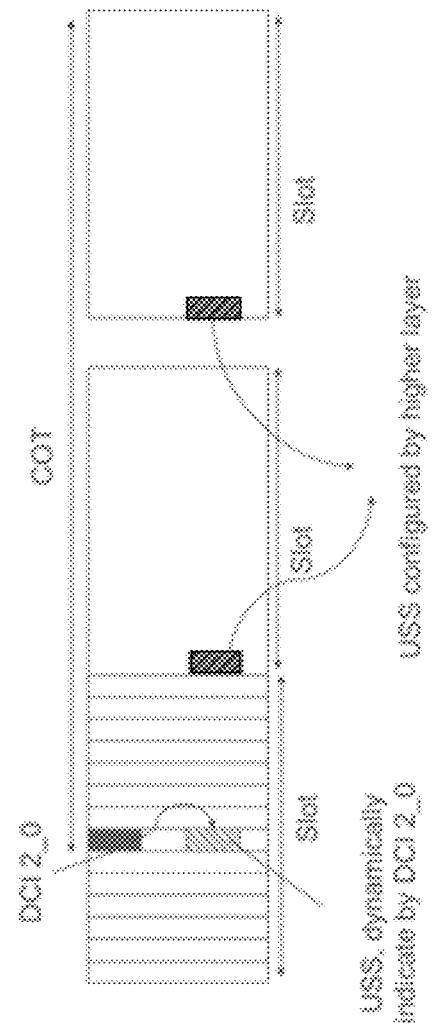
FIG. 4G illustrates an example of flags included in DCI 2_0 in accordance with some embodiments.

According to some embodiments of this disclosure, as shown in FIG. 4G, DCI 2_0 may include a flag indicating the presence of PDCCH within the partial slot for possible PDSCH scheduling. More specifically, USS may share a same starting symbol as search space of DCI 2_0 or a different starting symbol with some predefined offset. For the subsequent slots, UE may still monitor PDCCH on USS based on the monitoring periodicity configured by RRC on a per UE basis.

Since other DCI is dependent on correct reception of DCI 2_0, the reliable reception of DCI 2_0 is important. For increasing the reliability of DCI 2_0 reception, DCI 2_0 can be repeated for multiple CORESETs using mini-slot level granularity. If the DCI 2_0 is repeated in multiple CORESETs inside one slot, then the slot format combination information would be the same among the multiple DCI 2_0, so UE can perform soft combining between potential DCI 2_0 positions for DCI 2_0 monitoring. Soft combining may not be used for DCI 2_0 monitoring.

For increasing the reliability of DCI 2_0, it is also possible to utilize the wideband DMRS for CORESET where DCI 2_0 is transmitted. By using wideband DMRS, the channel estimation performance for DCI 2_0 can be increased and also DMRS itself can be also used for facilitating of COT detection by a UE. This wideband DMRS can be configured by RRC or wideband DMRS is always assumed for the monitoring of DCI 2_0. In another embodiment, if COT is indicated by DCI 2_0 to a UE, UE may not try to monitor DCI 2_0 using a mini-slot level granularity. UE may monitor DCIs including DCI 2_0 using slot level granularity. Therefore, if it happens that gNB lose the COT and reacquire the COT and the start of the COT is inside the duration of the previous COT, then the DCI 2_0 can be transmitted slot-level granularity. Therefore, once the UE detects the DCI 2_0 and knows the COT information, UE is not expected to monitor DCIs more often than determined timing granularity (e.g., slot level granularity) during the COT duration.

Figure 4H:
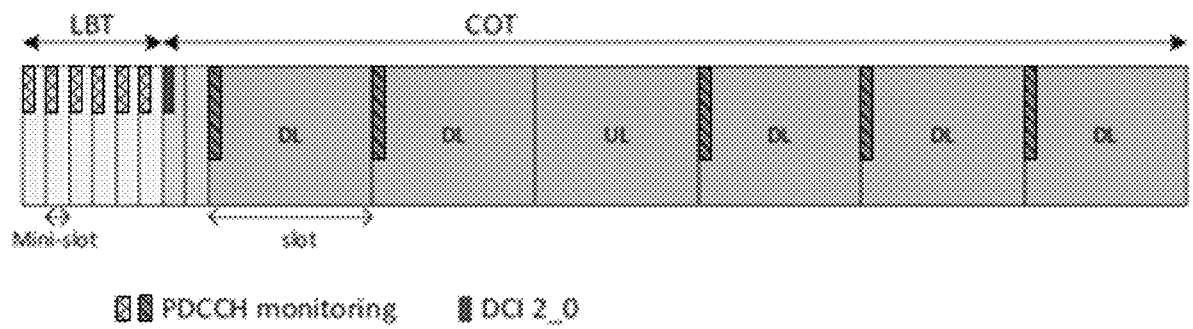
FIG. 4H illustrates an example of two-step PDCCH monitoring for DCI 2_0 in accordance with some embodiments.

FIG. 4H illustrates an example of two-step PDCCH monitoring for DCI 2_0. In some embodiments, if COT is indicated by DCI 2_0 to a UE, UE may not try to monitor DCI 2_0 using a mini-slot level granularity. UE may monitor DCIs including DCI 2_0 using slot level granularity. Therefore, if it happens that gNB lose the COT and reacquire the COT and the start of the COT is inside the duration of the previous COT, then the DCI 2_0 can be transmitted slot-level granularity. Therefore, once the UE detects the DCI 2_0 and knows the COT information, UE is not expected to monitor DCIs more often than determined timing granularity (e.g., slot level granularity) during the COT duration.

In another embodiment, for increasing the reliability of DCI 2_0, it is also possible to utilize the wideband DMRS for CORESET where DCI 2_0 is transmitted. Wideband DMRS can be realized by assuming the same precoding for the PRBs that are contiguous in frequency domain for a CORESET. Or wideband DMRS can be also realized by assuming the same precoder granularity for all the PRBs for a CORESET. So for the detection of DMRS or detection of DCI 2_0 or GC-PDCCH UE may assume same precoding for either PRBs that are contiguous in frequency domain for a CORESET or all PRBs for a CORESET unless configured otherwise. And UE may assume DMRS is transmitted over the all PRBs inside the CORESET In another embodiment, for increasing the reliability of DCI 2_0, it is also possible to utilize distributed resources over the frequency domain. Distributed CORESET resource can be realized by assuming interleaved CCE (Control Channel Element) to REG (Resource Element Group) mapping. So for the detection of DCI 2_0 or GC-PDCCH, UE may assume interleaved CCE to REG mapping for a CORESET unless configured otherwise.

In one embodiment, DCI2_0 on GC-PDCCH can be also configured for the UE which does not receive any UE-specific configuration. Current DCI 2_0 and GC-PDCCH is configured by UE-specific RRC and UE does not able to receive GC-PDCCH before going into the connected mode where UE-specific RRC is configured. However, COT information may be beneficial for a UE during the initial access procedure in order to receive and transmit random access related channels. For that UE, common control signaling can be used for configuration GC-PDCCH and system information, e.g., Remaining Minimum System Information (RMSI) or PBCH could be the good option for configuring GC-PDCCH for those UEs.

However, the detailed configuration of DCI2_0/GC-PDCCH needs lots of information which is too much overhead for system information, e.g., RMSI. Therefore, it is important to reduce the configuration overhead for DCI2_0/GC-PDCCH and only essential information can be included in RMSI.

In some embodiments, the following information could be the candidate information for DCI2_0/GC-PDCCH which is used for initial access procedure: the COT length in the frequency domain (e.g., the remaining time of the total COT); the remaining time of an acquired COT in which a downlink transmission is performed; and/or the COT structure in the frequency domain (e.g., for a cell larger than 20 MHz).

The position of the information for initial access can fixed inside the DCI format 2_0 payload in order for all UEs to understand the exact position. Other UE-specifically configured information can be positioned anywhere inside the DCI format 2_0 which can avoid collisions with the above information for initial access since the position can be flexibly indicated by UE-specific RRC.

This GC-PDCCH for DCI 2_0 can be transmitted in one or more of type0, type 0A, type 1, and type 2 common search spaces in order for UE to receive GC-PDCCH for the COT used for random access related channels, paging related channels, or system information related channels.

In another embodiment, new DCI format and corresponding GC-PDCCH (or a form of PDCCH) is configured for initial access procedure (and it can be also used for connected mode procedure after initial access). The configuration of the DCI format and GC-PDCCH, e.g., number of bits, how the information field consists, which aggregation level is used, what kind of interleaving is used, REG (resource element group) bundle size, DMRS configuration, is either fixed in the specification or configured by the system information, e.g., PBCH, RMSI, or OSI (Other System Information). The new DCI format, (which may be referred to herein as "DCI format 2_X"), can indicate a variety of COT information including: the COT length in the frequency domain (e.g., remaining time of the total COT); the remaining time of an acquired COT in which downlink transmission is performed; and/or the COT structure in the frequency domain (e.g., for a cell larger than 20 MHz).

Figure 4I:
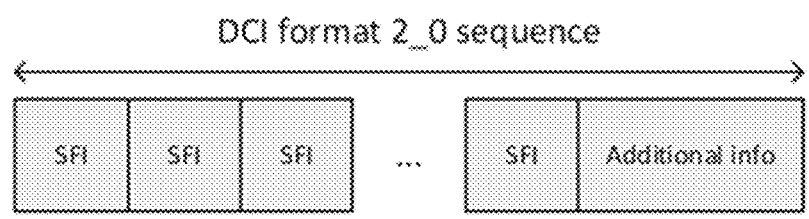
FIG. 4I illustrates an example of an indication of COT length in accordance with some embodiments.

The GC-PDCCH for DCI format 2_X can be encoded using polar code and the CRC is masked by an ID, where this ID is either fixed in the specification or configured by system information. And this GC-PDCCH for DCI 2_X can be transmitted in one or more of type0, type 0A, type 1, and type 2 common search spaces in order for UE to receive this GC-PDCCH for the COT used for random access related channels, paging related channels, or system information related channels. In some embodiments, additional information to indicate the COT structure can be supported by DCI format 2_0 by adding a separate field as illustrated in FIG. 4I.

An indication of the COT can comprise a variety of indicators. In some embodiments, for example, the indication of the COT may include an indication, in terms of one or more frequency sub-bands, within the applicable BWP, associated with this indication, which may depend on LBT status.

In some embodiments, the indication of the COT may include an indication, in terms of a time-interval, of the remaining time of an acquired COT by the gNB. This indication can be used by a UE in the serving cell for determination of LBT type for uplink transmission within that time-interval unless overridden by a gNB indication. This behavior is applicable to the set of associated frequency sub-bands in the applicable BWP. This can also be used to determine the applicability of the associated slot-format related information for the applicable BWP.

In some embodiments, the indication of the COT may include an indication, in terms of a time-interval, of the remaining time of an acquired COT in which the gNB intends to continue downlink transmission (actual downlink transmission may continue after this time). This indication can be used by an UE in the serving cell for determining that no scheduled transmission from the gNB is expected to fail due to LBT failure during the indicated time-interval. This is applicable to the set of associated frequency sub-bands in the applicable BWP.

In some embodiments, the indication of the COT may include an indication, in terms of a time-interval preceding a transmission, during which the gNB has performed no downlink transmission due to LBT failure. This indication can be used by a UE in the serving cell for determining that various monitoring functions like radio link monitoring, energy tracking, AGC tracking, etc. performed in such an indicated time-interval has not been measured from the serving cell. This is applicable to the set of associated frequency sub-bands in the applicable BWP.

In some embodiments, the indication of the COT may include an indication, in terms of a time-interval preceding this transmission, during which the gNB has performed downlink transmission. This indication can be used by a UE in the serving cell for determining that various monitoring functions like radio link monitoring, energy envelope tracking, AGC tracking etc. performed in such an indicated time-interval has been measured from the serving cell. This is applicable to the set of associated frequency sub-bands in the applicable BWP.

In some embodiments, the indication of the COT may include an indication of whether configured grant based transmission is allowed in the UL parts of the COT or only scheduled transmission is allowed. If this indication indicates configured grant based transmission is allowed in the UL parts, then a UE which is configured with configured grant based transmission can get access the uplink part and transmit configured grant transmissions.

In one embodiment, additional NW ID information can be included in DCI format 2_0 (or other DCI if used for NR-U). The position of NW ID can be fixed by the specification or configured by higher layer signaling inside the DCI format 2_0 payload as illustrated in FIG. 4I (at the last part of DCI 2_0 payload).

In some embodiments, the NW ID can indicate which operator is actually transmitting this DCI 2_0. Since the NR-U is using unlicensed band, multiple operators can use the same band. Therefore even if the UE receives DCI format 2_0 using its cell ID, it may be from the other operator which is using the same cell ID. If the UE decodes DCI 2_0 and the NW ID inside it does not match the its NW ID of interest, then the UE does not need to follow the next procedure based on the information of received DCI format 2_0 but it can try to decode other DCI format 2_0 which has the valid NW ID.

In some embodiments, the NW ID can use the whole high layer ID, e.g., TMSI or PLMN ID, or the NW ID can be derived from the high layer ID in order to reduce the number of bits for DCI 2_0. The derivation may use modulo operation, e.g., NW_ID=(PLMN ID, K), where K is the number of bits for NW IE in DCI 2_0.

Figure 5:
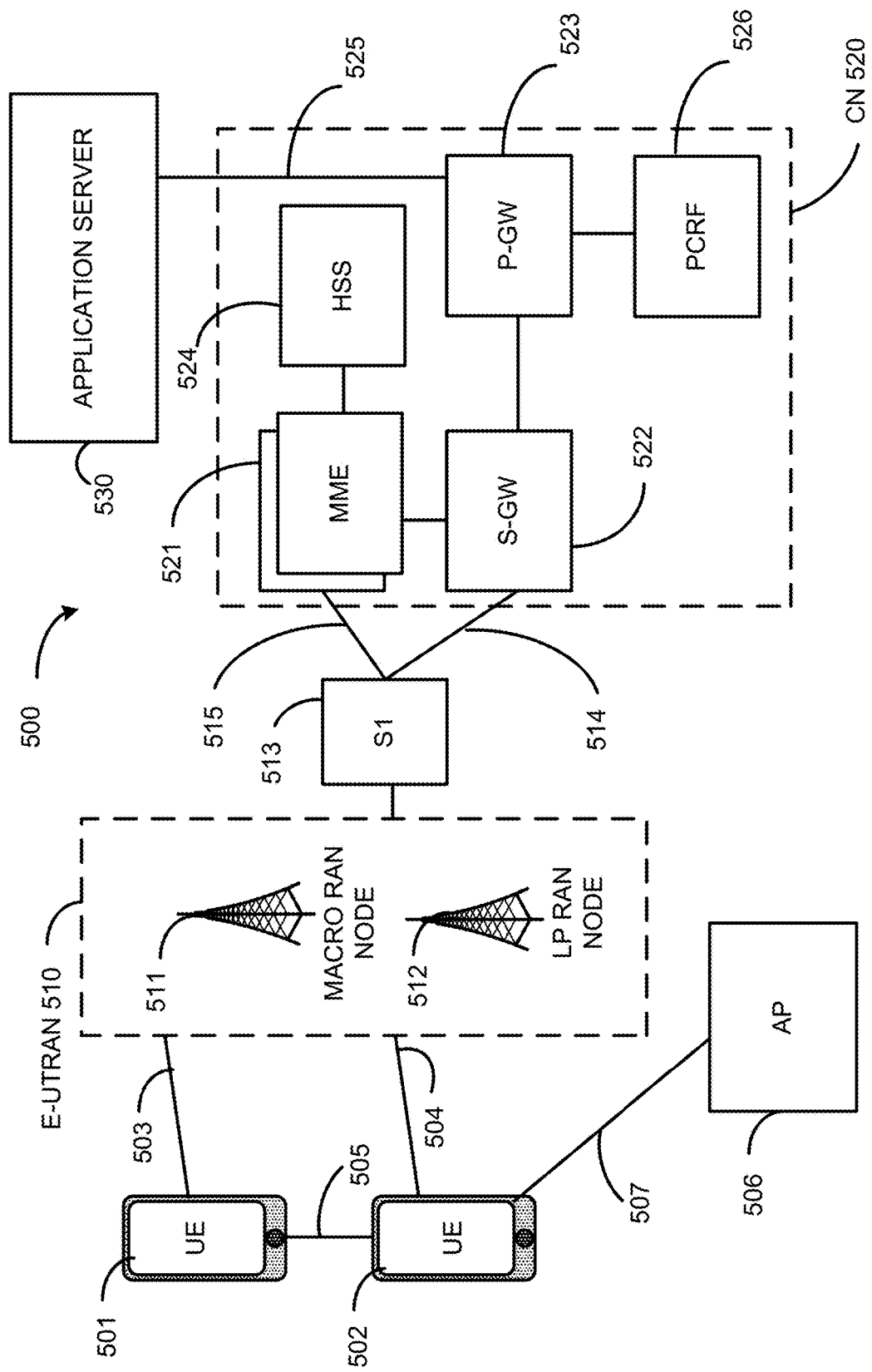
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
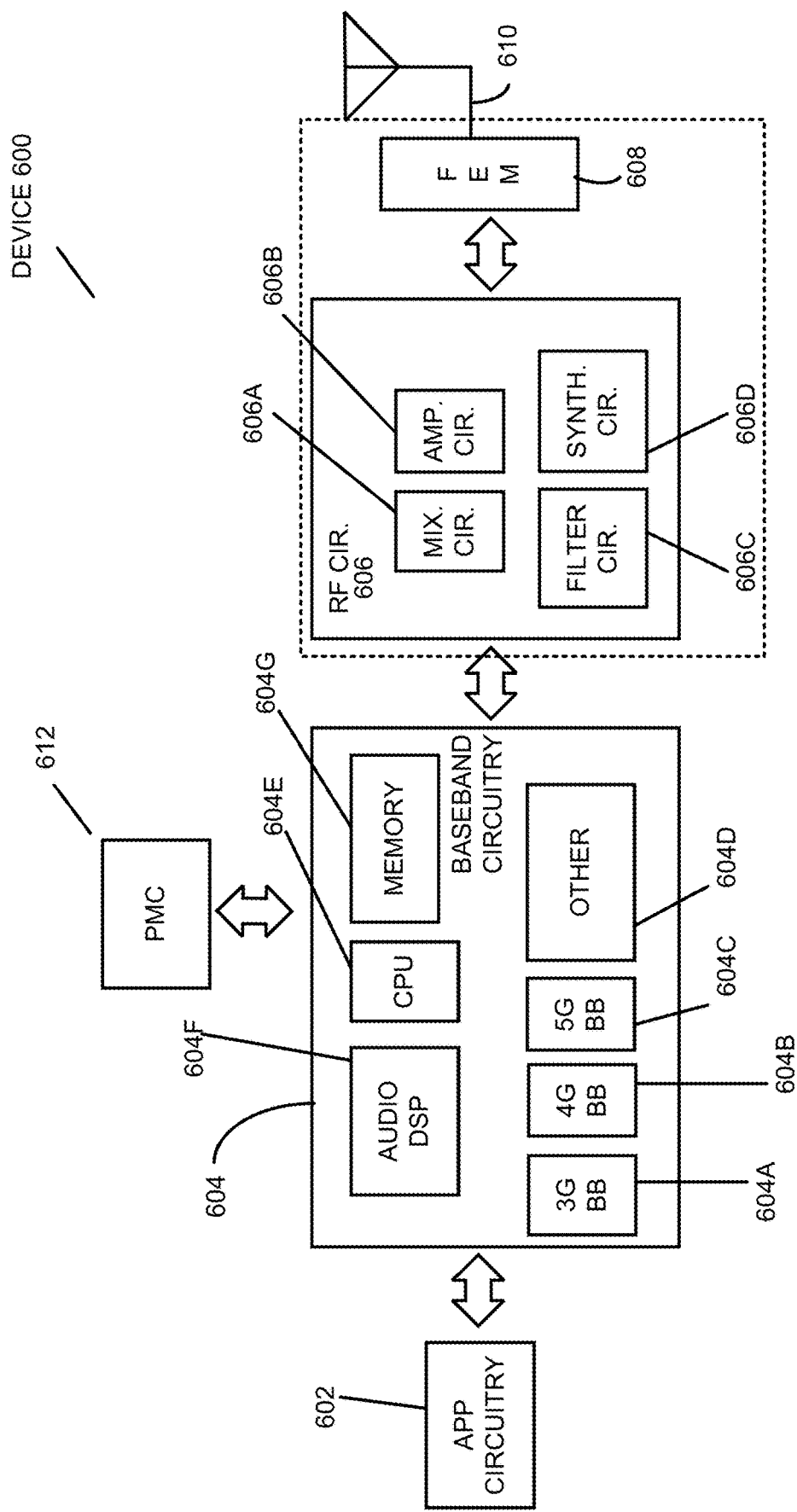
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606*a*, amplifier circuitry 606*b* and filter circuitry 606*c*. In some embodiments, the transmit signal path of the RF circuitry 606 may include filter circuitry 606*c* and mixer circuitry 606*a*. RF circuitry 606 may also include synthesizer circuitry 606*d* for synthesizing a frequency for use by the mixer circuitry 606*a* of the receive signal path and the transmit signal path. In some embodiments, the mixer circuitry 606*a* of the receive signal path may be configured to down-convert RF signals received from the FEM circuitry 608 based on the synthesized frequency provided by synthesizer circuitry 606*d*. The amplifier circuitry 606*b* may be configured to amplify the down-converted signals and the filter circuitry 606*c* may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
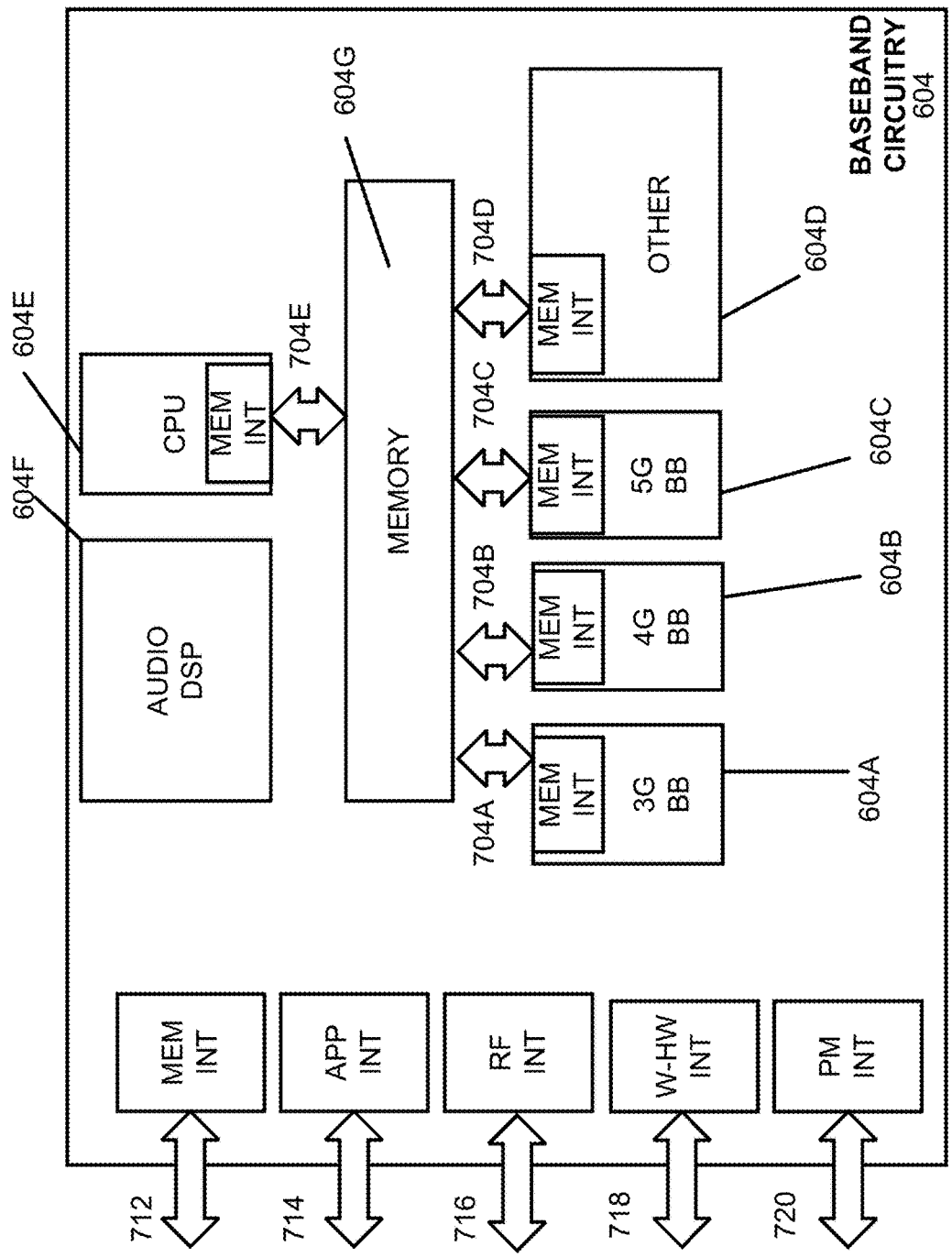
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
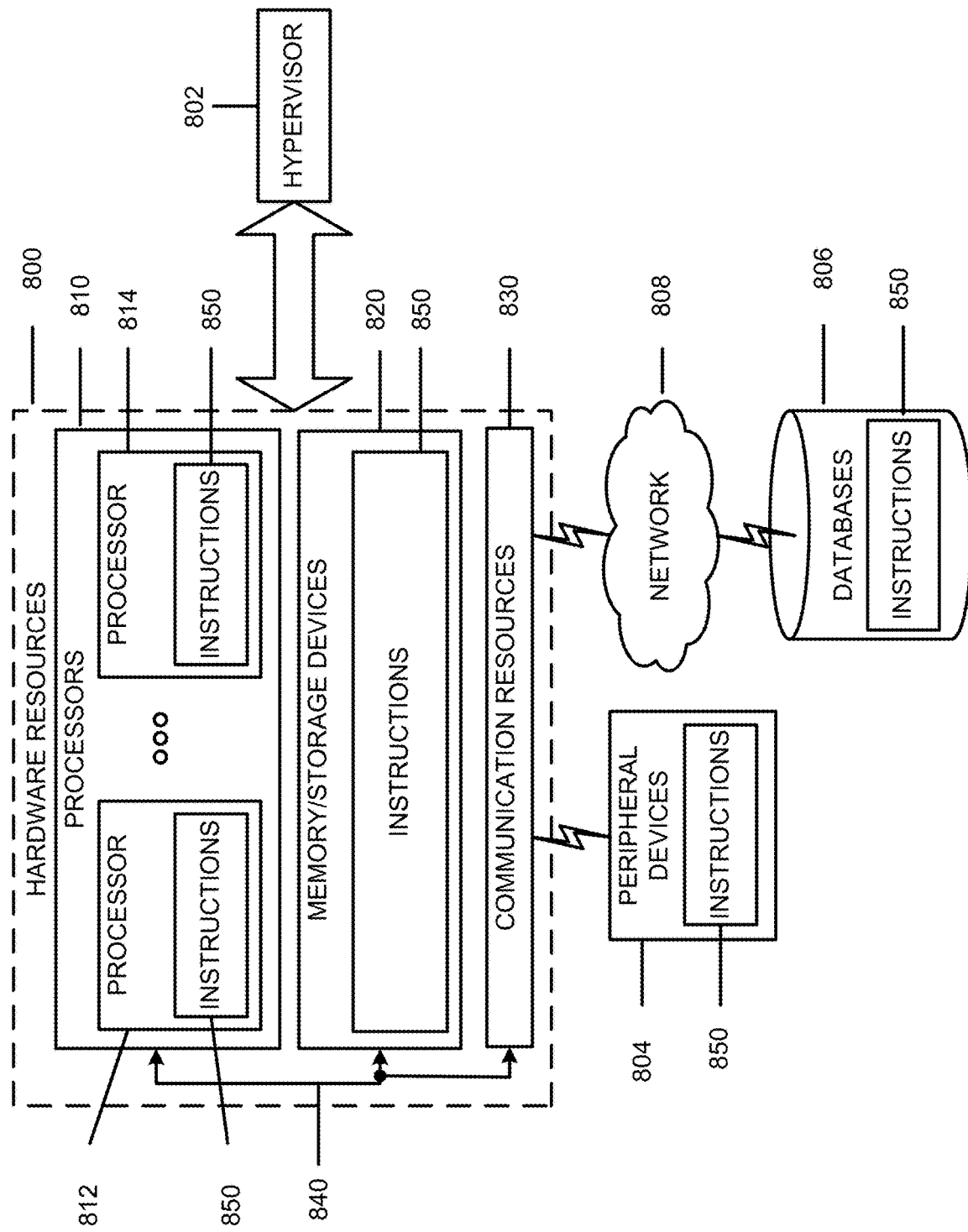
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 3:
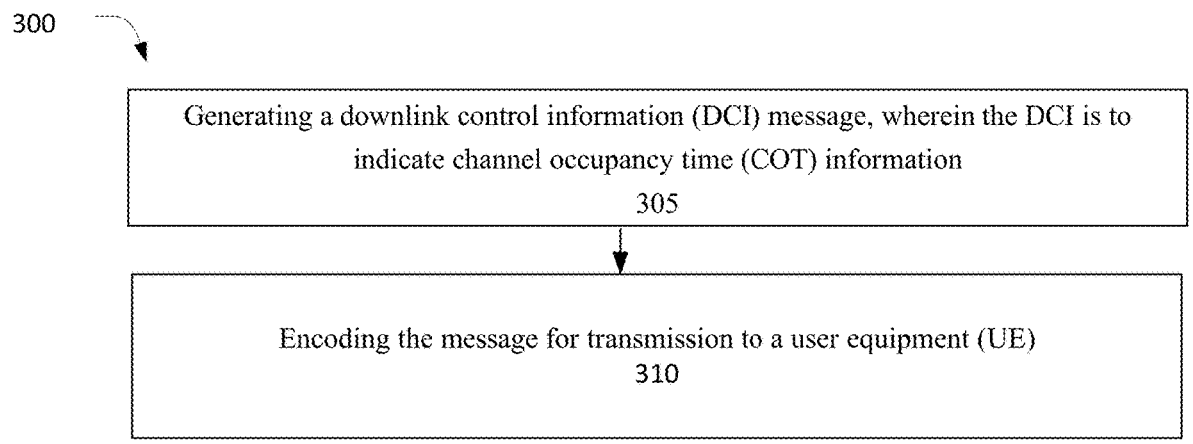

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) in accordance with some embodiments. In this example, operation flow/algorithmic structure 100 may include, at 105, retrieving channel occupancy time (COT) information from a memory. Operation flow/algorithmic structure 100 may further include, at 110, generating a message that includes downlink control information (DCI), wherein the DCI is to indicate the COT information. Operation flow/algorithmic structure 100 may further include, at 115, encoding the message for transmission to a UE.

Another example of an operation flow/algorithmic structure is depicted in FIG. 2, which may be performed by a UE in accordance with some embodiments. In this example, operation flow/algorithmic structure 200 may include, at 205, receiving a message comprising downlink control information (DCI) that indicates channel occupancy time (COT) information. Operation flow/algorithmic structure 200 may further include, at 210, determining a monitoring periodicity based on the DCI.

Another example of an operation flow/algorithmic structure is depicted in FIG. 3, which may be performed by a gNB in accordance with some embodiments. In this example, operation flow/algorithmic structure 300 may include, at 305, generating a downlink control information (DCI) message, wherein the DCI is to indicate channel occupancy time (COT) information. Operation flow/algorithmic structure 300 may further include, at 310, encoding the message for transmission to a user equipment (UE).

EXAMPLES

Some non-limiting examples are provided below.

Example 1 includes an apparatus comprising: memory to store channel occupancy time (COT) information; and processing circuitry, coupled with the memory, to: retrieve the COT information from the memory; generate a message that includes downlink control information (DCI), wherein the DCI is to indicate the COT information; and encode the message for transmission to a user equipment (UE).

Example 2 includes the apparatus of example 1 or some other example herein, wherein the DCI is downlink control information format 2_0 (DCI 2_0).

Example 3 includes the apparatus of example 2 or some other example herein, wherein the COT information includes a COT length that is indicated in the DCI 2_0 using a slot format combination length.

Example 4 includes the apparatus of example 2 or some other example herein, wherein the DCI 2_0 includes a field to indicate a monitoring period of a search space.

Example 5 includes the apparatus of example 4 or some other example herein, wherein the field is a one-bit field to indicate either: a first period (T1); or a second period (T2).

Example 6 includes the apparatus of example 1 or some other example herein, wherein the DCI is to indicate the COT information via an indication of one or more frequency sub-bands within a bandwidth part (BWP).

Example 7 includes the apparatus of example 1 or some other example herein, wherein the DCI includes a remaining time of an acquired COT in which a downlink transmission is performed.

Example 8 includes the apparatus of example 1 or some other example herein, wherein the message is encoded for transmission via a physical downlink control channel (PDCCH) or a group common physical downlink control channel (GC-PDCCH).

Example 9 includes one or more non-transitory computer-readable media storing instructions that, when executed by one or more processors, cause a user equipment (UE) to: receive a message comprising downlink control information (DCI) that indicates channel occupancy time (COT) information; and determine a monitoring periodicity based on the DCI.

Example 10 includes the one or more non-transitory computer-readable media of example 9 or some other example herein, wherein the DCI is a downlink control information format 2_0 (DCI 2_0), wherein the COT information includes a COT length that is indicated in the DCI 2_0 using a slot format combination length, and wherein a monitoring period of a search space is indicated in the DCI 2_0 using a one-bit field.

Example 11 includes the one or more non-transitory computer-readable media of example 9 or some other example herein, wherein the DCI indicates the COT information via an indication of one or more frequency sub-bands within a bandwidth part (BWP).

Example 12 includes the one or more non-transitory computer-readable media of example 9 or some other example herein, wherein the DCI includes a remaining time of an acquired COT in which a downlink transmission is performed.

Example 13 includes the one or more non-transitory computer-readable media of example 9 or some other example herein, wherein the message is received via a physical downlink control channel (PDCCH) or a group common physical downlink control channel (GC-PDCCH).

Example 14 includes one or more non-transitory computer-readable media storing instructions that, when executed by one or more processors, cause a next-generation NodeB (gNB) to: generate a downlink control information (DCI) message, wherein the DCI is to indicate channel occupancy time (COT) information; and encode the message for transmission to a user equipment (UE).

Example 15 includes the one or more non-transitory computer-readable media of example 14 or some other example herein, wherein the DCI is downlink control information format 2_0 (DCI 2_0).

Example 16 includes the one or more non-transitory computer-readable media of example 15 or some other example herein, wherein the COT information includes a COT length that is indicated in the DCI 2_0 using a slot format combination length, and wherein the COT information is indicated in the DCI 2_0 via an indication of one or more frequency sub-bands within a bandwidth part (BWP).

Example 17 includes the one or more non-transitory computer-readable media of example 15 or some other example herein, wherein the DCI 2_0 includes a field to indicate a monitoring period of a search space.

Example 18 includes the one or more non-transitory computer-readable media of example 17 or some other example herein, wherein the field is a one-bit field to indicate either: a first period (T1); or a second period (T2).

Example 19 includes the one or more non-transitory computer-readable media of example 14 or some other example herein, wherein the DCI includes a remaining time of an acquired COT in which a downlink transmission is performed.

Example 20 includes the one or more non-transitory computer-readable media of example 14 or some other example herein, wherein the message is encoded for transmission via a physical downlink control channel (PDCCH) or a group common physical downlink control channel (GC-PDCCH).

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. One or more non-transitory computer-readable media storing instructions that, when executed by one or more processors, are to cause a user equipment (UE) to:
   receive a message comprising downlink control information format 2_0 (DCI 2_0) that indicates channel occupancy time (COT) information, wherein the COT information includes a field to indicate a monitoring period of a search space; and
   determine a monitoring periodicity based on the DCI 2_0.

2. The one or more non-transitory computer-readable media of claim 1, wherein the COT information in the DCI 2_0 includes slot format information.

3. The one or more non-transitory computer-readable media of claim 1, wherein the COT information in the DCI 2_0 includes an indication of a time duration of a COT initiated by a next-generation NodeB (gNB).

4. The one or more non-transitory computer-readable media of claim 3, wherein the media further stores instructions to cause the UE to configure an uplink (UL) transmission based on the indication of the time duration of the COT initiated by the gNB.

5. The one or more non-transitory computer-readable media of claim 1, wherein the message is received via a physical downlink control channel (PDCCH) or a group common physical downlink control channel (GC-PDCCH).

6. An apparatus of a next-generation NodeB (gNB) comprising:
   memory to store channel occupancy time (COT) information; and
   processing circuitry, coupled with the memory, to:
     retrieve the COT information from the memory;
     generate a message that includes downlink control information format 2_0 (DCI 2_0), wherein the DCI 2_0 is to indicate the COT information, and wherein the DCI 2_0 includes a field to indicate a monitoring period of a search space; and
     encode the message for transmission to a user equipment (UE).

7. The apparatus of claim 6, wherein the COT information in the DCI 2_0 includes slot format information.

8. The apparatus of claim 6, wherein the COT information in the DCI 2_0 includes an indication of a time duration of a COT initiated by the gNB.

9. The apparatus of claim 6, wherein the message is encoded for transmission via a physical downlink control channel (PDCCH) or a group common physical downlink control channel (GC-PDCCH).

10. One or more non-transitory computer-readable media storing instructions that, when executed by one or more processors, cause a next-generation NodeB (gNB) to:
    generate a downlink control information format 2_0 (DCI 2_0) message, wherein the DCI 2_0 message comprises channel occupancy time (COT) information that includes a field to indicate a monitoring period of a search space; and
    encode the message for transmission to a user equipment (UE).

11. The one or more non-transitory computer-readable media of claim 10, wherein the COT information in the DCI 2_0 includes slot format information.

12. The one or more non-transitory computer-readable media of claim 10, wherein the COT information in the DCI 2_0 includes an indication of a time duration of a COT initiated by the gNB.

13. The one or more non-transitory computer-readable media of claim 10, wherein the message is encoded for transmission via a physical downlink control channel (PDCCH) or a group common physical downlink control channel (GC-PDCCH).

* * * * *